United States Patent
Sugihara (10) Patent No.: US 9,440,619 B2
(45) Date of Patent: Sep. 13, 2016

(54) STEERING LOCK DEVICE

(71) Applicant: U-SHIN LTD., Tokyo (JP)

(72) Inventor: Satoshi Sugihara, Kure (JP)

(73) Assignee: U-SHIN LTD., Tokyo (JP)

( * ) Notice: Subject to any disclaimer, the term of this patent is extended or adjusted under 35 U.S.C. 154(b) by 0 days.

(21) Appl. No.: 14/259,580

(22) Filed: Apr. 23, 2014

(65) Prior Publication Data

US 2014/0318197 A1 Oct. 30, 2014

(30) Foreign Application Priority Data

Apr. 26, 2013 (JP) ................................. 2013-093679
Jun. 26, 2013 (JP) ................................. 2013-133384

(51) Int. Cl.
*B60R 25/021* (2013.01)
*B62D 1/19* (2006.01)

(52) U.S. Cl.
CPC ......... *B60R 25/02126* (2013.01); *B62D 1/197* (2013.01); *Y10T 70/5956* (2015.04)

(58) Field of Classification Search
CPC .................... Y10T 70/5956; B60R 25/02126; B60R 2025/0405; B60R 25/02113; B60R 25/02153; B62D 1/197
USPC ........................... 70/182–186, 252, 190, 191
See application file for complete search history.

(56) References Cited

U.S. PATENT DOCUMENTS

| 3,638,462 | A | * | 2/1972 | White et al. ................... 70/186 |
| 3,686,906 | A | * | 8/1972 | Watkins et al. ................. 70/252 |
| 3,791,182 | A | * | 2/1974 | Oxley ............... B60R 25/02142 70/252 |
| 3,985,009 | A | * | 10/1976 | Lipschutz ....................... 70/252 |
| 4,250,976 | A | * | 2/1981 | Mochida ....................... 180/271 |
| 4,837,567 | A | * | 6/1989 | Kleefeldt et al. ............ 340/5.72 |
| 5,291,067 | A | * | 3/1994 | Nakajima et al. ............. 307/9.1 |
| 5,634,358 | A | * | 6/1997 | Myers ............................. 70/233 |
| 6,003,349 | A | * | 12/1999 | Nagae et al. .................... 70/186 |
| 6,389,856 | B1 | * | 5/2002 | Watanuki et al. .............. 70/186 |
| 2002/0088257 | A1 | * | 7/2002 | Dimig et al. ................... 70/186 |
| 2003/0015006 | A1 | * | 1/2003 | Tamukai ........................ 70/186 |
| 2003/0079509 | A1 | * | 5/2003 | Ochi .............................. 70/186 |
| 2004/0206139 | A1 | * | 10/2004 | Imai ............................... 70/186 |
| 2006/0081023 | A1 | * | 4/2006 | Tanimoto ....................... 70/186 |
| 2010/0024495 | A1 | * | 2/2010 | Nakamoto et al. ............ 70/252 |
| 2013/0319164 | A1 |   | 12/2013 | Inoue |

FOREIGN PATENT DOCUMENTS

| EP | 2 055 530 B1 | 5/2009 | |
| GB | 2451185 A | * 1/2009 | ............. B60R 25/02 |

(Continued)

*Primary Examiner* — Christopher Boswell
*Assistant Examiner* — Amanda L Miller
(74) *Attorney, Agent, or Firm* — Kratz, Quintos & Hanson, LLP (57) ABSTRACT

A steering lock device includes a lock bolt configured to correspond to rotation of a key cylinder and to unlock a steering shaft, and an ignition switch configured to correspond to the rotation of the key cylinder and to perform switch operation. In the steering lock device, the lock bolt is provided to a rear side of a body in a direction of a body side orthogonal to a rotation axis of the key cylinder. Also, the ignition switch includes a first switch and a second switch and is arranged to a side part of the body in a direction different from the forward movement direction of the lock bolt. The first switch is configured as the ignition switch and the second switch is configured as a key detection switch.

6 Claims, 11 Drawing Sheets

(56) References Cited　　　　　　　　　　　　　　* cited by examiner

FOREIGN PATENT DOCUMENTS

| GB | 2465680 B | * | 9/2012 |
| JP | H07-32973 | | 2/1995 |
| JP | 2006-111124 A1 | | 4/2006 |

STEERING LOCK DEVICE

BACKGROUND

1. Technical Field

The present invention relates to a steering lock device for a vehicle, including an ignition switch.

2. Related Art

As a steering lock device for a vehicle, those with the following configurations are widely known.

Referring to a steering lock device described, for example, in JP 7-32973 A as a first conventional example, a tubular holder is fixed to a font side in a hollow body and a cylindrical key cylinder which becomes rotatable when a key is inserted is provided in the holder. Also, between a middle part and a rear side in the body, a camshaft which rotates integrally with the key cylinder is extended, and a lock bolt which operates orthogonally to a rotary shaft of the key cylinder is moved forward and backward by a cam provided to the camshaft.

Thus, the lock bolt moves forward and backward corresponding to the rotation of the key cylinder and is locked to/unlocked from a recessed groove of a steering shaft to lock or unlock the rotation of the steering shaft. Also, to a rear end of the body, an ignition switch is provided. The ignition switch is an engine starting switch to which rotation force of the key cylinder is transferred through the camshaft and which performs switch operation.

The steering lock device of the first conventional example is arranged on a side of a lower surface of the steering shaft which is elongated in a longitudinal direction of a vehicle. That is, to make it easy for a driver to see a meter or the like through a steering wheel, the steering lock device is not arranged on a side of an upper surface of the steering shaft.

However, when the steering lock device is arranged on the side of the lower surface of the steering shaft, in a case of a vehicle clash, a knee or the like of a driver may be hit by the steering lock device and may be damaged. Therefore, it is necessary to provide a structure of security measures for such damage with the steering lock device, and thus, cost increase is caused.

Thus, to solve a problem of such damage described above, a steering lock device, which includes a configuration in which an ignition switch is arranged to one side of a steering shaft, has been proposed (for example, in JP 2006-111124 A: second conventional example). That is, in the steering lock device, an outer cylinder is fixed to a front side of a body and a key cylinder, which becomes movable when a key is inserted, is provided in the outer cylinder. Also, at a rear end of the body, a steering lock mechanism which includes a cam configured to rotate integrally with the key cylinder and which is moved forward and backward, by the cam, in a direction of a rotary shaft of the key cylinder to lock or unlock a steering shaft is included. Moreover, in a side part on a rear side of the body, an ignition switch is provided.

The steering lock device of the second conventional example configured in such a manner is arranged to one side of a steering shaft, and thus, even in a case of a vehicle clash, a knee or the like of a driver is not hit by the steering lock device. Thus, the steering lock device solves the problem of the damage above.

Moreover, the steering lock device described above may include a key detection switch other than an ignition switch. The key detection switch detects whether a key is inserted into a key cylinder, and is an alarm device to prevent a key from being confined in a vehicle by issuing an alert in a case where a door is closed with the key being inserted.

SUMMARY

Although the described steering lock device of the second conventional example can prevent a knee or the like of a driver from being hit in a case of a vehicle clash, there is a different problem such as the one in the following. That is, around a steering shaft, a column adjustment device including a tilt mechanism to adjust a vertical position of a steering handle according to a physical constitution or driving posture of a driver, or a telescopic mechanism to adjust a longitudinal direction thereof is arranged. Also, on a side of the steering handle of the column adjustment device, a combination switch device to activate a direction indicator, a wiper, a light, or the like is further arranged.

Since the steering lock device is mounted between the column adjustment device and the combination switch device, in a case where a distance between the column adjustment device and the combination switch device is close and a space is small, there is a case where the steering lock device of the second conventional example which has a wide main body in an axial direction of the steering shaft cannot be mounted.

Also, for a case where a body of a driver is hit by a steering wheel due to an accident or the like, there is a shock-absorption type steering device in which a steering wheel is displaced to a front to reduce the shock applied to the body. The shock-absorption type steering device includes a steering wheel, a first steering column to which a combination switch device and the like are mounted, and a second steering column including a column adjustment device and the like. When shock is applied, the first steering column and the second steering column are relatively moved, and thus, the steering wheel is displaced to the front side.

In the device, it is necessary to make a collapse stroke (distance between combination switch device and column adjustment device), which is the length the steering wheel can be displaced to the front to protect the driver adequately during the shock, as long as possible. However, when a steering lock device mounted between the combination switch device and the column adjustment device requires a large arrangement space like the one in the second conventional example, movement of the steering wheel and the combination switch device is limited, and thus, it is not possible to make the collapse stroke long.

Also, when an ignition switch and a key detection switch are included separately like the described steering lock device, wiring and a connector for the connection to a control device of a vehicle become necessary for each of them, and thus, the number of components increases and assembling work becomes cumbersome.

Thus, in the embodiments of the present invention, a steering lock device which can secure the safety of a driver in a case of a vehicle clash and can be mounted to a small space around a steering shaft is proposed. Also, a steering lock device which makes it possible to perform wire connection or assembling work of an ignition switch and a key detection switch easier is provided.

To achieve the purpose described above, in a first invention of the present invention, a steering lock device including: a hollow body; a key cylinder which is provided to a front side in the body and becomes rotatable when a key is inserted; a lock bolt configured to correspond to rotation of the key cylinder and to lock or unlock rotation of a steering shaft; an ignition switch configured to correspond to the rotation of the key cylinder and to perform switch operation, wherein the lock bolt is provided in a rear side of the body in such a manner that the lock bolt can move forward and backward in a direction along a body side orthogonal to a rotation axis of the key cylinder, and the ignition switch is arranged to a side part of the body, which is in a direction different from a forward movement direction of the lock bolt, and further includes a gear mechanism configured to transfer rotation driving force of the key cylinder to the ignition switch, is proposed.

In a second invention, the steering lock device according to the first invention, wherein the ignition switch is arranged to the body in such a manner that a rotating operation shaft of a rotor of a rotary switch configured to perform switch operation becomes orthogonal to the rotation axis of the key cylinder, is proposed.

In a third invention, the steering lock device according to the first invention, wherein the gear mechanism includes a first bevel gear configured to rotate coaxially with the key cylinder, and a second bevel gear provided to the rotating operation shaft of the ignition switch and coupled to the first bevel gear, is proposed.

In a fourth invention, the steering lock device according to the first invention, wherein the ignition switch is arranged to a side part of the body in an opposite direction, across the rotation axis of the key cylinder, of the forward movement direction of the lock bolt, is proposed.

In a fifth invention, the steering lock device according to the first invention, wherein an opening part for assembly of an attachment component such as the gear mechanism is provided to a side part of the body in a direction orthogonal to a forward-backward direction of the lock bolt, is proposed.

In a sixth invention, the steering lock device according to the first invention, wherein the ignition switch is arranged to a part of the body, in which the rotating operation shaft of the ignition switch is between a position elongated in an opposite direction, across the rotation axis of the key cylinder, of the forward movement direction of the lock bolt and a position orthogonal to the forward movement direction of the lock bolt, is proposed.

In a seventh invention, the steering lock device according to the first invention, wherein the ignition switch includes a first switch and a second switch and is arranged to a side part of the body in a direction different from the forward movement direction of the lock bolt, and the first switch is configured as an ignition switch which includes a main switch including a rotary switch, and the second switch is configured as a key detection switch including a push switch which is pushed by a driving shaft movably provided to a rotating operation shaft of the rotary switch and performs switch operation, the steering lock device further including: a gear mechanism configured to convert rotation driving force of the key cylinder from a direction of the rotation axis of the key cylinder to the orthogonal direction and to transfer to a rotor of the rotary switch; and a cam mechanism for a switch, configured to move the driving shaft by backward movement of the key cylinder due to insertion of a key, is provided.

In an eighth invention, the steering lock device according to the seventh invention, wherein the gear mechanism includes a first bevel gear provided to a camshaft coupled to the key cylinder and a second bevel gear which is coupled to the first bevel gear and rotates around a rotary shaft in an orthogonal direction to a rotary shaft of the first bevel gear, the second bevel gear being coupled to the rotor of the rotary switch, and the cam mechanism for a switch includes a cam provided to the camshaft, configured to push the driving shaft, is proposed.

In a ninth invention, the steering lock device according to the seventh invention, wherein the first bevel gear is arranged coaxially with the camshaft, is proposed.

In a tenth invention, the steering lock device according to the seventh invention, further including a lock bolt which can be locked to/unlocked from the steering shaft and a cam for a lock, configured to make the lock bolt operate according to the rotation of the key cylinder, wherein the cam for a lock and a cam of the cam mechanism for a switch are provided to the camshaft coupled to the key cylinder, is proposed.

In an eleventh invention, the steering lock device according to the seventh invention, wherein a cam of the cam mechanism for a switch includes a tilting part configured to move the driving shaft by movement in an axial direction of the camshaft and a circular apex configured to hold the driving shaft at a moved position during the rotation of the camshaft, is proposed.

The steering lock device of the first invention includes a lock bolt in a rear side of a body in such a manner that the lock bolt can move forward and backward in a direction along a body side orthogonal to a rotation axis of a key cylinder, whereby the body becomes substantially L-shaped. Also, an ignition switch is arranged to a side part of the body in a direction different from a forward movement direction of the lock bolt, whereby the ignition switch does not protrude from a rear end of the device. Thus, the steering lock device can be mounted even to a small attachment space in a side part of a steering shaft. As a result, it becomes possible to secure safety of a driver and to mount the steering lock device to a small space around a steering shaft.

In the steering lock device of the second invention, a rotating operation shaft of a rotary switch forming an ignition switch becomes orthogonal to a rotation axis of a key cylinder, and thus, rotation force of the key cylinder can be transferred to the ignition switch by a simple gear mechanism.

In the steering lock device of the third invention, a rotation conversion mechanism to transfer rotation force of a key cylinder to an ignition switch is configured from a simple gear mechanism including a first bevel gear and a second bevel gear. Also, when the device is designed, and in a case where an arrangement position of the ignition switch is moved in a direction around a rotation axis of the key cylinder, an internal configuration of the steering lock device can be made by a simple change of moving a position of the second bevel gear in a direction around the rotation axis. Thus, degree of freedom in designing is improved and a layout is also improved.

According to the steering lock device of the fourth invention, since an ignition switch is arranged to a side part of a body in an opposite direction, across a rotation axis of a key cylinder, of a forward movement direction of a lock bolt, an arrangement position of the ignition switch corresponding to the rotation axis of the key cylinder and a position in a forward-backward direction of the lock bolt corresponding to the rotation axis of the key cylinder can be made approximate as much as possible. Thus, a shape of the steering lock device in a direction of the rotation axis of the key cylinder is shortened. That is, it becomes possible to make the steering lock device smaller, and a layout is further improved.

According to the steering lock device of the fifth invention, even in a steering lock device in which an ignition switch is arranged to a side part of a body lapped with a direction of a body side in which a lock bolt moves forward and backward, a component or a gear mechanism to activate the lock bolt can be assembled from an opening formed on a side part of the body.

In the steering lock device of the sixth invention, an ignition switch is arranged to a part of a body, in which the rotating operation shaft of the ignition switch is between a position elongated in an opposite direction, across a rotation axis of a key cylinder, of a forward movement direction of a lock bolt and a position orthogonal to the forward movement direction of the lock bolt.

In the steering lock device of the seventh invention, similarly to the steering lock device of the first embodiment, an ignition switch is arranged to a side part of a body in a direction different from the forward movement direction of the lock bolt, and thus, the ignition switch does not protrude from a rear end of the device. Therefore, the steering lock device can be mounted to a small attachment space in a side part of a steering shaft. As a result, it becomes possible to secure safety of a driver and to mount the steering lock device to a small space around a steering shaft.

Also, according to the steering lock device, a key detection switch can be configured integrally with the ignition switch provided to a side part of the body. Thus, it becomes easy to perform wire connection or assembling work of the ignition switch and the key detection switch.

In the steering lock device of the eighth invention, a gear mechanism is employed to transfer rotation driving force of a key cylinder to an ignition switch, and a cam mechanism for a switch is employed to transfer, to a key detection switch, insertion of a key into the key cylinder. Thus, a configuration becomes simple and the device can be made smaller.

In the steering lock device of the ninth invention, a camshaft and a first bevel gear can be arranged collectively, and thus, there is an advantage in making the device smaller.

In the steering lock device of the tenth invention, a cam to make a lock mechanism operate and a cam to make a key detection switch operate are provided to one camshaft, whereby the number of components can be reduced, and thus, a manufacturing cost can be reduced.

In the steering lock device of the eleventh invention, as a cam of a cam mechanism for a switch, a tilting part to move a driving shaft and a circular apex to hold the driving shaft at a moved position are provided, and thus, a key detection switch can be switched on and off by a simple configuration of this cam mechanism for a switch.

BRIEF DESCRIPTION OF DRAWINGS

FIG. 3 is a rear view of the steering lock device, illustrating an opening for assembly of a lock bolt, a gear mechanism, or the like;

DETAILED DESCRIPTION

Next, an invention of a steering lock device for a vehicle according to the present invention will be described with reference to the drawings.

Figure 1:
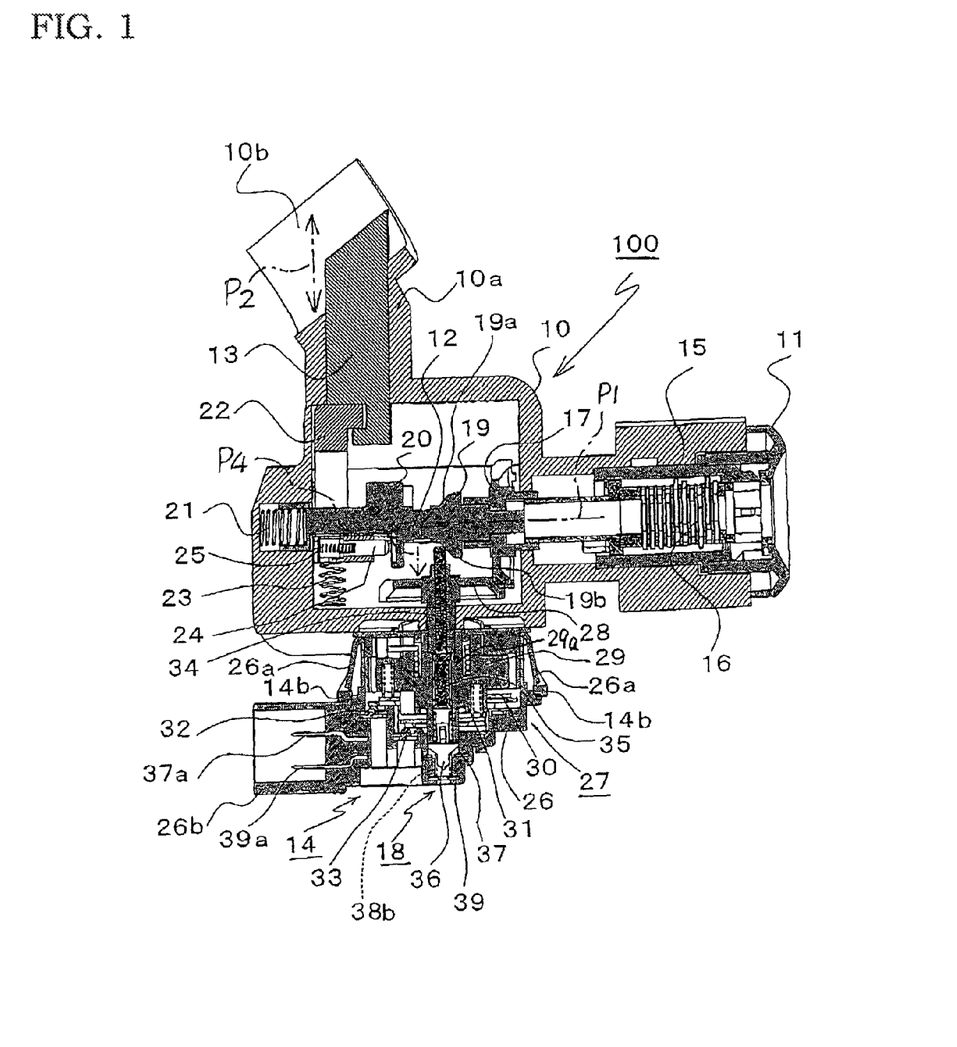
FIG. 1 is a sectional view of a steering lock device, which is an embodiment of the present invention and is cut in a direction of a rotation axis of a key cylinder.
Figure 2:
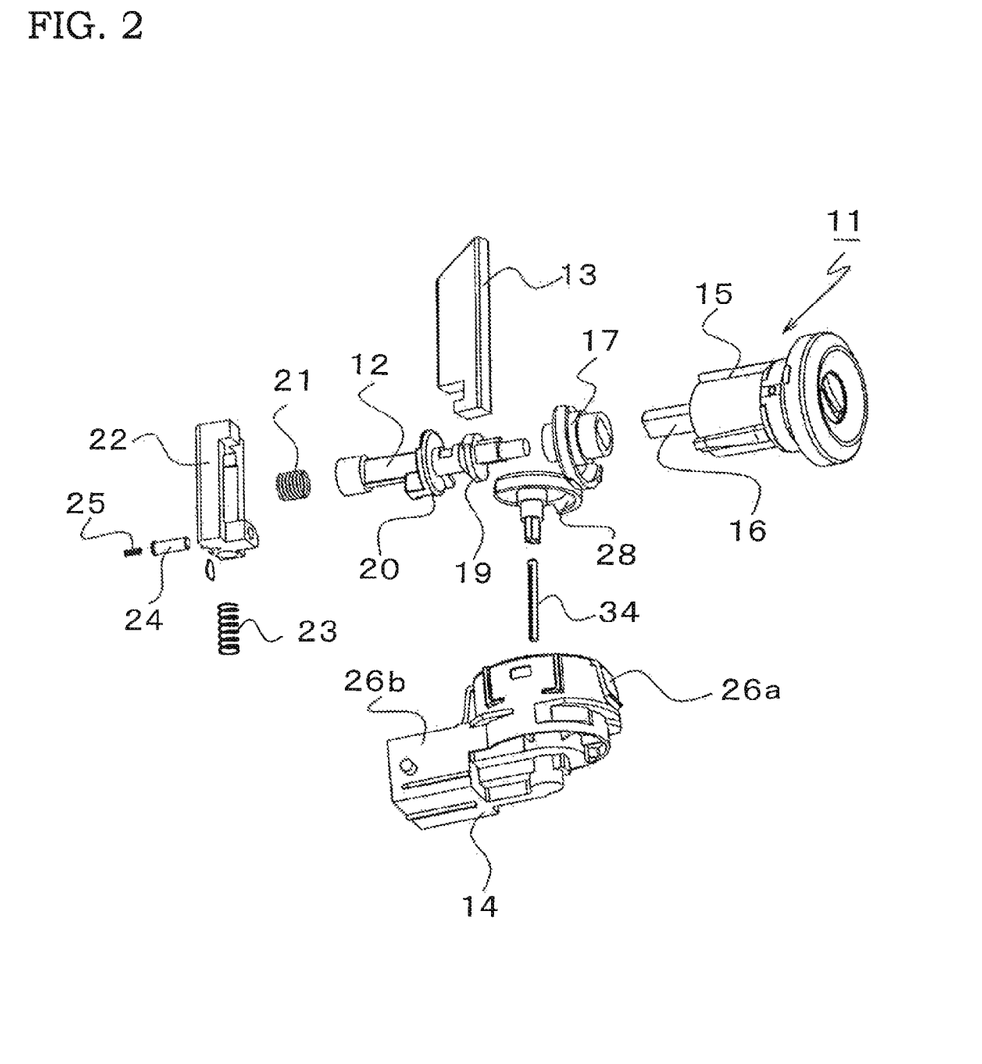
FIG. 2 is an exploded perspective view in which a body is omitted and internal components of the steering lock device are illustrated.

As illustrated in FIG. 1 and FIG. 2, for example, in the steering lock device 100 of the present embodiment, components such as a cylinder lock 11, a camshaft 12, and a lock bolt 13 are housed in a hollow body 10 formed integrally from a metal material such as zinc. Also, in FIG. 1, an ignition switch 14 is bound to a lower side part of the body 10.

The cylinder lock 11 includes a holder 15 fixed to a front side (right side in FIG. 1) in the body 10 and a key cylinder 16 which becomes rotatable in the holder 15 when a key is inserted. Specifically, the cylinder lock 11 includes a well-known configuration in which due to the insertion of a key, a tumbler provided to the key cylinder 16 moves out from a recessed groove of the holder 15 and the key cylinder 16 becomes rotatable.

The camshaft 12 provided to a middle in the body 10 is coupled to a rear end of the key cylinder 16 and rotates integrally with the key cylinder 16 around an axis which is coaxial with a rotation axis of the key cylinder 16. To the camshaft 12, a first bevel gear 17 to transfer driving force to the ignition switch 14 is supported slidably and pivotally in such a manner that the first bevel gear 17 rotates integrally therewith. In addition, to the camshaft 12, a first cam (cam for switch) 19 and a second cam (cam for lock) 20 are integrally formed. The first cam 19 makes a key detection switch 18, which is provided together with the ignition switch 14, operate. The second cam 20 moves the lock bolt 13 forward and backward.

The first cam 19 includes a tilting part 19a, which is substantially conical and tilts outside in a radial direction from a rear side to a front side, and a cylindrical circular apex 19b which is placed, in the front side, contiguously with the tilting part 19a. Note that to the key cylinder 16 and the camshaft 12, pressing force in a direction toward the front (direction toward the right in FIG. 1) is applied by a spring 21 provided to the rear end (left end in FIG. 1) in the body 10.

On the one hand, the lock bolt 13 is slidably provided in a coupling tube part 10a formed integrally with the body 10. Together with the second cam 20, a hanger 22, a spring 23, and the like, the lock bolt 13 forms a lock mechanism of the steering shaft. Specifically, the lock bolt 13 is provided in such a manner that it can move forward and backward in a direction of a body side orthogonal to the rotation axis of the key cylinder 16. When the second cam 20 of the camshaft 12 rotates, the hanger 22 moves down against spring force of the spring 23, whereby the lock bolt 13 moves in a downward direction and moves out from a recessed groove (not illustrated) of the steering shaft. Thus, the lock bolt 13 is unlocked.

Also, at a leading end of the coupling tube part 10a, an arc-shaped attachment part 10b is provided. As described later, the attachment part 10b uses a bracket and holds a steering column to mount the steering lock device 100. Note that to the hanger 22 of the lock mechanism, a pin 24 and a spring 25 which keep an unlocked state are provided in order to prevent a risk of the steering shaft being locked during the drive.

On the other hand, the ignition switch 14 is arranged, on a side part of the body which is in the opposite direction, across the rotation axis of the key cylinder 16, of a forward movement direction of the lock bolt 13, in such a manner that a rotating operation shaft thereof is orthogonal to the rotation axis of the key cylinder 16. Locking claws 26a provided to both sides of a switch case 26 are locked to lock receiving parts 14b provided to the body 10, whereby the ignition switch 14 is bond.

The ignition switch 14 includes a well-known main switch (first switch) 27 and the key detection switch (second switch) 18. As the key cylinder 16 is rotated, by a key, from a locked position to an ACC position, to an on-position, and to a start position, the main switch 27 turns on a power source of an accessory such as a radio, turns on various indicator lamps, and starts an engine by activating a starter motor. The key detection switch 18 has been described above.

That is, the main switch 27 includes a second bevel gear 28, a rotor 29, a rotary switch, and fixed contacts 32 and 33. The second bevel gear 28 forms a gear mechanism in which the second bevel gear 28 is meshed with the first bevel gear 17 to perform driving force conversion. The rotor 29 includes a resin material and is integrally coupled to the second bevel gear 28. The rotary switch includes disk-shaped contact plates 30 and 31 provided to the rotor 29. The fixed contacts 32 and 33 are provided to a switch case 26. Note that the second bevel gear 28 is rotatably arranged in the body 10 in such a manner that a rotary shaft of the second bevel gear 28, which matches the rotating operation shaft of the rotor 29 of the main switch 27, becomes orthogonal to the rotation axis of the key cylinder 16.

Figure 5:
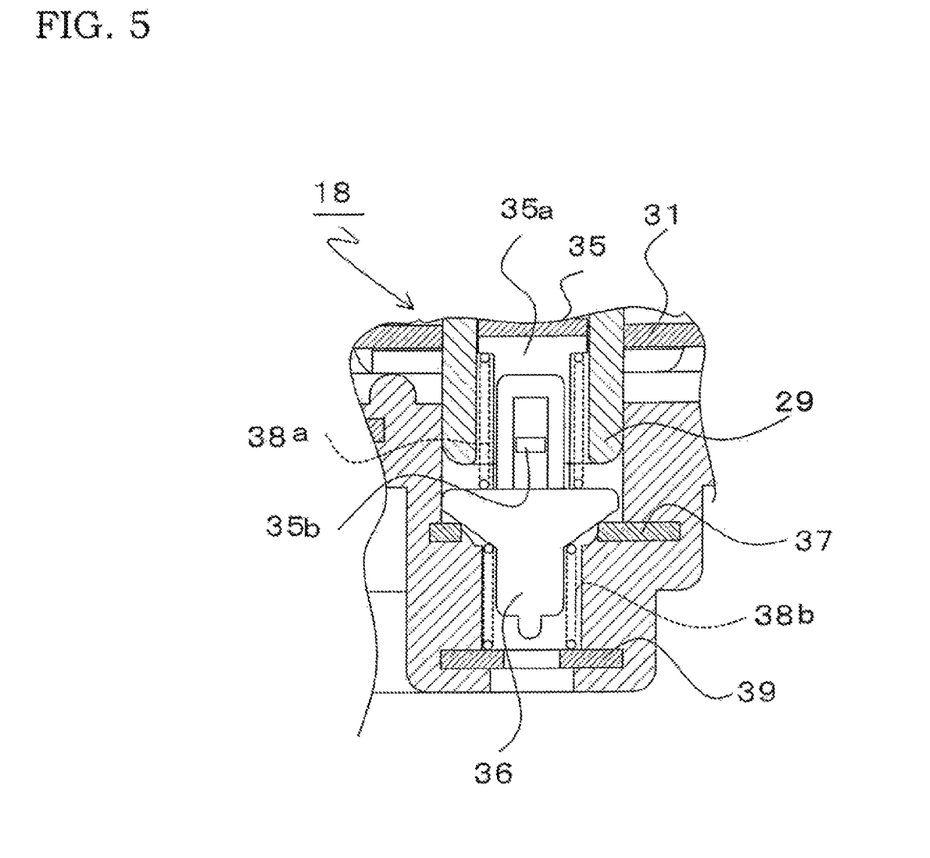
FIG. 5 is a partial view in which a part of a key detection switch is enlarged and illustrated, the part being indicated by a two-dot-dashed line Q in FIG. 4.

Also, the key detection switch 18 includes a driving shaft 34 provided slidably in a barrel part of the second bevel gear 28. The driving shaft 34 is driven downward (driven in downward direction in FIG. 1) by the first cam 19 of the camshaft 12, whereby a slide pin 35 including a resin material is pushed by the driving shaft 34 and moves in the downward direction in FIG. 1. As it can been seen from the enlarged partial view illustrated in FIG. 5, when a movable contact 36 attached to the slide pin 35 comes into contact with a first fixed contact 37, the key detection switch 18 is switched on.

Figure 6A:
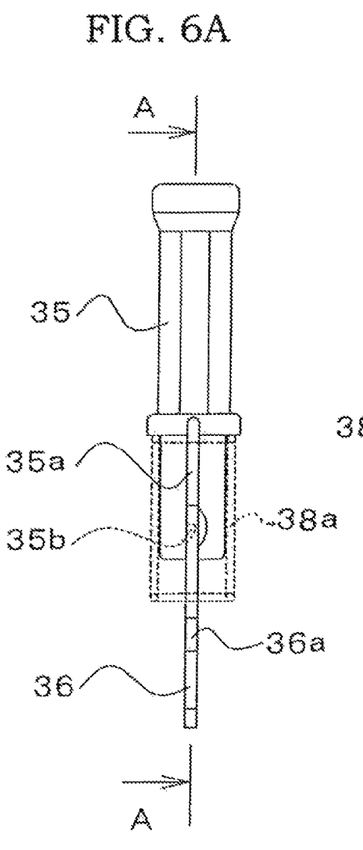
FIG. 6A is an enlarged side view of a slide pin which configures the key detection switch.
Figure 6B:
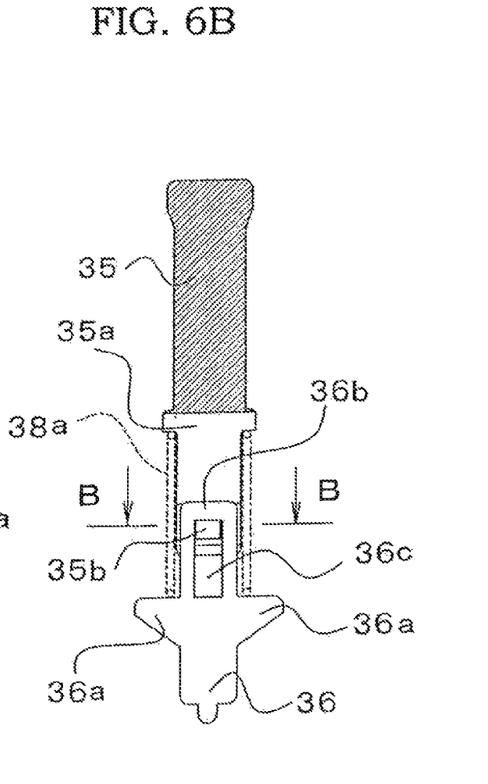
FIG. 6B is an A-A sectional view of FIG. 6A.
Figure 6C:
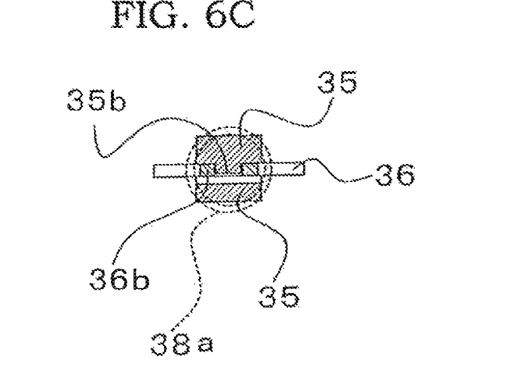
FIG. 6C is a B-B sectional view of FIG. 6B.

As illustrated in FIG. 6, the movable contact 36 includes a wing part 36a elongated in a light-left direction and a conductive plate including a leg part 36b. The leg part 36b is inserted into a long groove 35a of the slide pin 35, and a protrusion 35b provided to the slide pin 35 protrudes into a hole part 36c provided to the leg part 36b. Thus, the movable contact 36 is movable to the slide pin 35. Although the movable contact 36 is constantly pressed by a spring 38a and receives spring force in a direction to move out from the long groove 35a, the movable contact is kept in the state illustrates in FIG. 1 and FIG. 6 since a hole edge of the hole part 36c is abut against the protrusion 35b.

When the movable contact 36 comes into contact with the first fixed contact 37, the movable contact 36 is electrically connected to a second fixed contact 39 through a conductive spring 38b provided between the movable contact 36 and the second fixed contact 39, whereby the first fixed contact 37 and the second fixed contact 39 become conductive to each other. Thus, the key detection switch 18 is switched on (see enlarged partial view illustrated in FIG. 5). In addition, the first fixed contact 37 and the second fixed contact 39 are formed integrally with terminals 37a and 39a provided to a connector part 26b of the switch case 26. These terminals 37a and 39a are connected to a key detection switch circuit.

Figure 3:
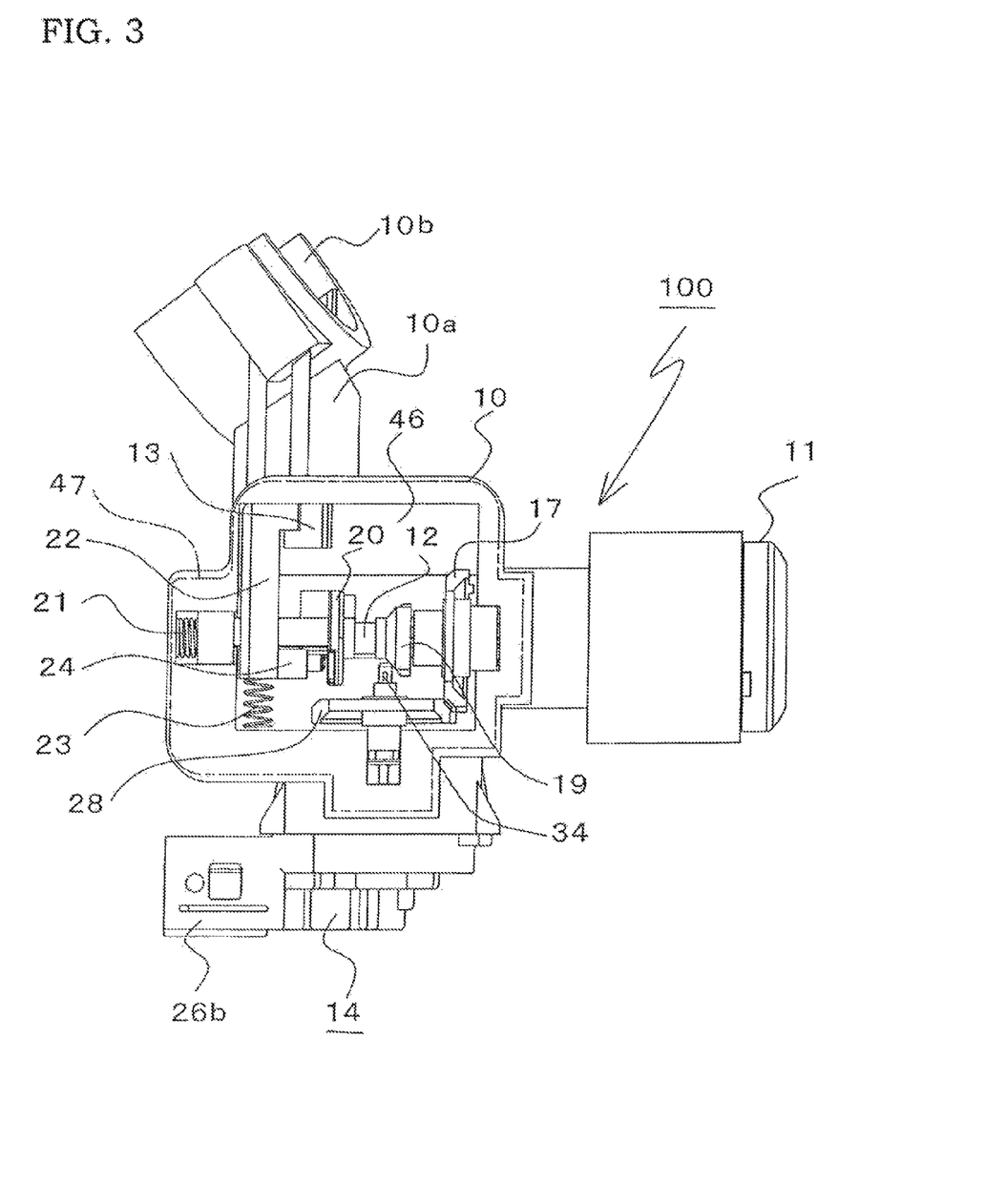

Also, in the steering lock device 100 configured in such a manner, as illustrated in FIG. 3, an opening part 46 is formed on a side surface of the body 10, to which surface the coupling tube part 10a or the ignition switch 14 is not provided. From the opening part 46, the hanger 22, the camshaft 12, the first bevel gear 17, the second bevel gear 28, and the like are assembled. Note that the lock bolt 13 is inserted, not from the opening part 46 but from the outside, into the coupling tube part 10a of the body 10. Then, the hanger 22 is assembled to the lock bolt 13 in the body 10. After predetermined components are assembled, a lid body 47 is fixed to the opening part 46 with a screw or a like.

Next, operation of the steering lock device 100 configured in such a manner will be described. In the state of FIG. 1, in which a key is not inserted into the key cylinder 16, since the key cylinder 16 and the camshaft 12 are moved to the front end side by the spring force of the spring 21, the lock bolt 13 receives the spring force of the spring 23 and moves forward, and thus, a leading end part thereof protrudes into the recessed groove of the steering shaft and the lock bolt 13 is locked.

Also, when a key is not inserted into the key cylinder 16, the first bevel gear 17 does not rotate, and thus, the main switch 27 of the ignition switch 14 does not operate. Moreover, as illustrated in FIG. 1, in the key detection switch 18 provided together with the ignition switch 14, the driving shaft 34 does not receive the cam action of the first cam 19, whereby the slide pin 35 moves upward in such a manner illustrated in FIG. 1. Thus, the movable contact 36 is not in contact with the first fixed contact 37 and the key detection switch 18 is switched off.

Figure 4:
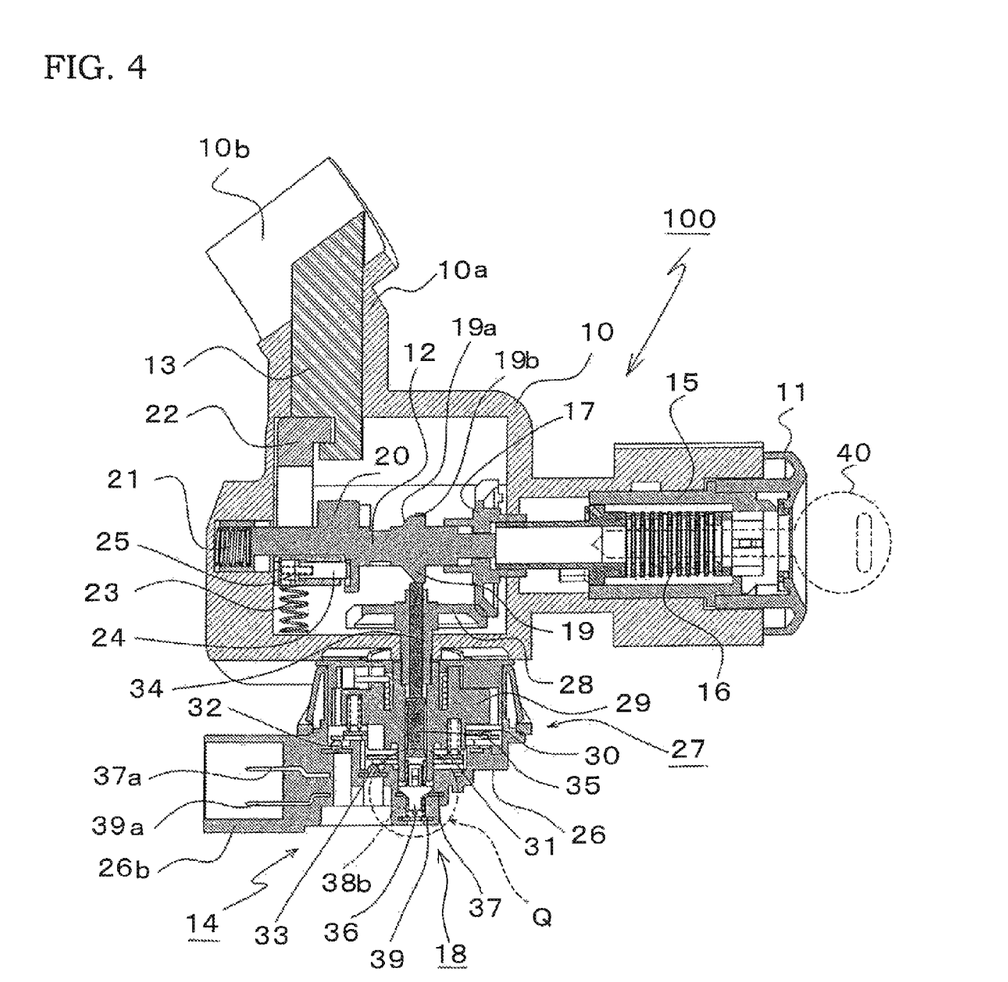
FIG. 4 is a sectional view which is similar to FIG. 1 and illustrates an operation state of when a key is inserted.

As illustrated in FIG. 4, when a key 40 is inserted into the key cylinder 16, a shutter 16a (see FIG. 7) arranged on the front end side of the key cylinder 16 is opened and the tumbler is retracted into the key cylinder 16, whereby the key cylinder 16 becomes rotatable. Also, when the key 40 is inserted into the key cylinder 16, the shutter 16a rotates and one end thereof abuts against a front end part in the holder 15. Thus, the key cylinder 16 and the camshaft 12 move, against the spring force of the spring 21, in a direction of the rear end in the body 10, whereby a leading end part of the driving shaft 34 of the ignition switch 14 ascends the tilting part 19a of the first cam 19 and goes up on the circular apex 19b.

That is, the driving shaft 34 receives the cam action of the first cam 19 and moves backward (downward movement in FIG. 1) and makes the slide pin 35 move in the same direction. Thus, since the movable contact 36 comes into contact with the first fixed contact 37 by the spring force of the spring, the first fixed contact 37 and the second fixed contact 39 are electrically connected to each other through the movable contact 36 and the conductive spring 38b. As a result, as the key detection switch 18 is switched on, the key detection circuit operates and informs that the key is inserted.

Note that the first bevel gear 17 and the second cam 20 are not rotated only by inserting the key 40, and thus, the lock bolt 13 is kept locked and the main switch 27 of the ignition switch 14 does not operate.

Figure 7:
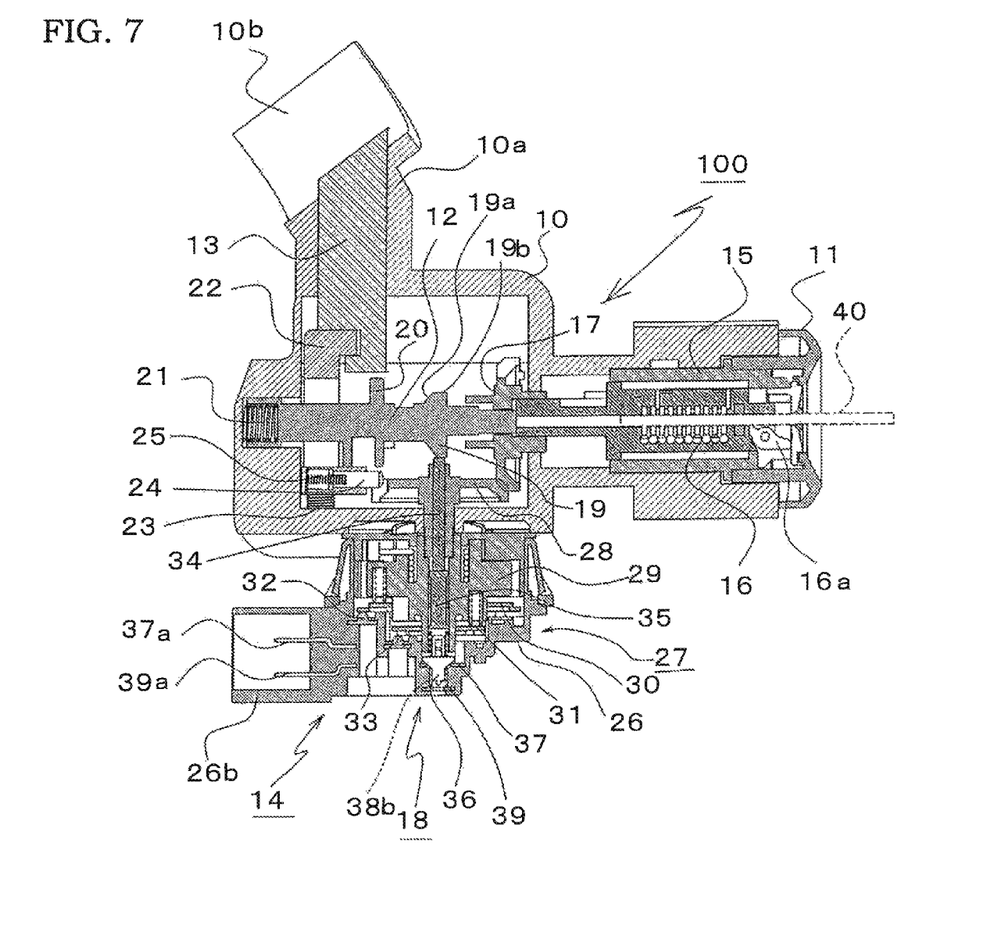
FIG. 7 is a sectional view which is similar to FIG. 1 and illustrates operation of when a key is rotated.

When the key 40 is rotated in the state of FIG. 4, the camshaft 12 corresponding to the rotation of the key cylinder 16 is rotated, and thus, an operation state becomes what is illustrated in FIG. 7. That is, when the key 40 is rotated from a key inserted position to an ACC position, the hanger 22 corresponds to the rotation of the second cam 20 and moves down. Thus, the lock bolt 13 moves backward and the leading end part thereof moves out from the recessed groove of the steering shaft, whereby the lock bolt 13 is unlocked.

Note that when the hanger 22 moves down, the pin 24 protrudes from a pin housing hole and a leading end part of the pin 24 is placed to a lower side of the second cam 20. Thus, while the key 40 is inserted, that is, while the key cylinder 16 and the camshaft 12 are moved in the rear end direction, the protruded pin 24 abuts against the circumference of the disk-shaped second cam 20 and prevents the hanger 22 from moving back, whereby the lock bolt 13 is reliably kept unlocked.

Also, due to the rotation of the first bevel gear 17, the rotor 29 rotates through the second bevel gear 28, whereby the contact plates 30 and 31 rotate. Thus, switch contacts are switched and the power source of an accessory such as a radio is turned on. Also, in a case where the key 40 is rotated to the on-position or to the start position, the main switch 27 operates in a similar manner, and thus, for example, various indicator lamps are turned on or an engine is started by activating a starter motor.

On the other hand, when the key 40 is rotated and returned from the ACC position to the locked position (key inserted position), the camshaft 12 is also reversed to the original position. However, the pin 24 still abuts against the circumference of the disk-shaped second cam 20, whereby the lock bolt 13 is still held unlocked.

Also, since the first bevel gear 17 rotates in the opposite direction of the above, the rotor 29 rotates in the opposite direction through the second bevel gear 28, and thus, the main switch 27 is switched off. Note that, in the operation state, the leading end part of the driving shaft 34 is on the circular apex 19b of the first cam 19, whereby the key detection switch 18 is switched on and the key detection circuit informs that the key is inserted.

When the key 40 is pulled out from the key cylinder 16, the operation state moves back to the state of FIG. 1. That is, the lock bolt 13 is locked, the main switch 27 is switched off, and the key detection switch 18 is also switched off. In other words, when the key 40 is pulled out from the key cylinder 16, the rotation of the shutter 16a is released, and the key cylinder 16 and camshaft 12 are moved to the front side by the spring force of the spring 21.

Thus, the engagement of the pin 24 and the circumference of the second cam 20 is released, and the lock bolt 13 and the hanger 22 receive the spring force of the spring 23 and move upward, whereby the lock bolt 13 moves forward and becomes locked. Also, due to the movement of the camshaft 12 in the front direction, the leading end part of the driving shaft 34 slides down from the circular apex 19b of the first cam 19 and moves to a bottom part. Since the driving shaft 34 is moved upward by the spring force of the spring 38a, the movable contact 36 moves away from the first fixed contact 37 along with the upward movement of the slide pin 35. As a result, the electrical connection between the first fixed contact 37 and the second fixed contact 39 is disconnected and the key detection switch is switched off, whereby the key detection circuit stops informing that the key is inserted.

Next, attachment of the steering lock device 100 will be described.

Figure 8:
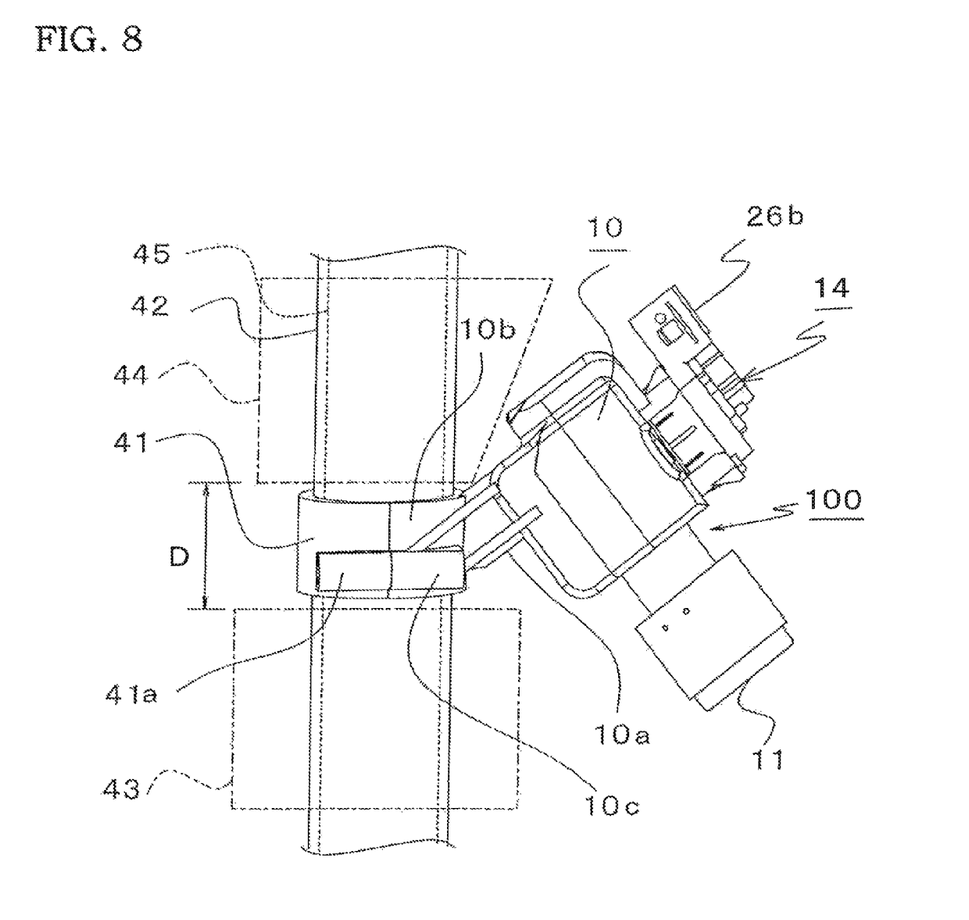
FIG. 8 is a plane view of the steering lock device attached to a steering shaft.

As illustrated in FIG. 8, the steering lock device 100 of the present embodiment clips a steering column 42 with the attachment part 10b and an arc-shaped bracket 41, and then, screw parts 10c and 41a respectively provided to the attachment part 10b and the bracket 41 are tightened. Thus, the steering lock device 100 is bound.

Also, in the steering lock device 100, the ignition switch 14 and the lock bolt 13 can be provided to side parts of the body 10 in such a manner that an arrangement position of the ignition switch 14 corresponding to the rotation axis of the key cylinder 16 and a position in a forward-backward direction of the lock bolt 13 corresponding to the rotation axis of the key cylinder 16 become approximate as much as possible. Thus, a shape of the steering lock device in a direction of the rotation axis of the key cylinder 16 can be shortened. That is, it becomes possible to make the steering lock device smaller, and a layout is further improved.

As illustrated in, the present embodiment, the coupling tube part 10a, in which the lock bolt 13 is provided and can move forward and backward, is provided to a side part of the body, orthogonal to the rotation axis of the key cylinder 16, in the rear side of the body 10. Also, since the ignition switch 14 is arranged to a side part of the body which is in the opposite side of the coupling tube part 10a, the steering lock device can be mounted even when a distance D between a combination switch device 43 and a column adjustment device 44 is short. In addition, since the steering lock device 100 is arranged not to the lower side of a steering shaft 45 but to the side thereof, the steering lock device 100 does not hit a knee of a driver in a case of a vehicle clash or the like.

Also, the steering lock device of the present embodiment can be mounted even in a case where the distance D is short, and thus, when the steering lock device of the present embodiment is mounted to a shock-absorption type steering device, the movement of a steering wheel and the combination switch device 43 to the front side during the shock can be long and the collapse stroke can be set long. Thus, safety of a driver can be improved.

Figure 9:
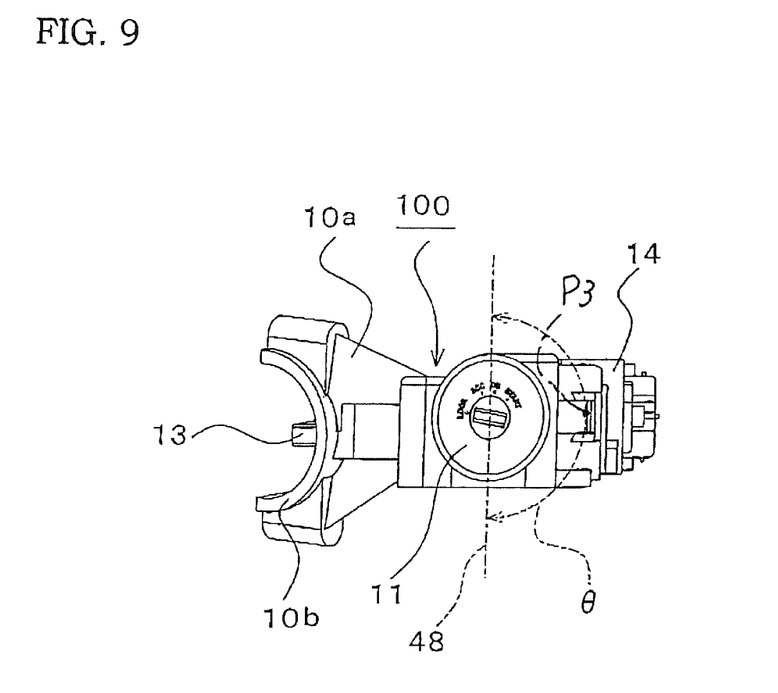
FIG. 9 is a front view of the steering lock device, illustrating an embodiment in which an ignition switch is provided to a right side of a body.
Figure 10:
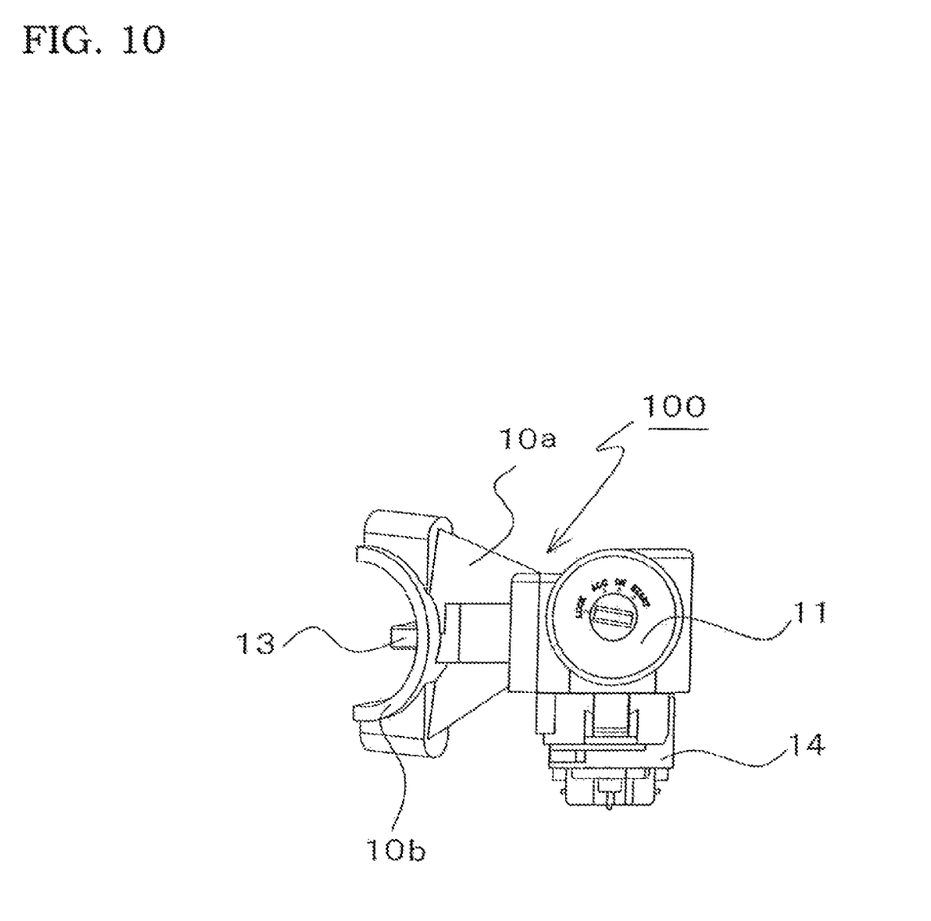
FIG. 10 is a front view of a steering lock device similar to that of FIG. 9, illustrating an embodiment in which an ignition switch is provided to a lower side of a body.
Figure 11:
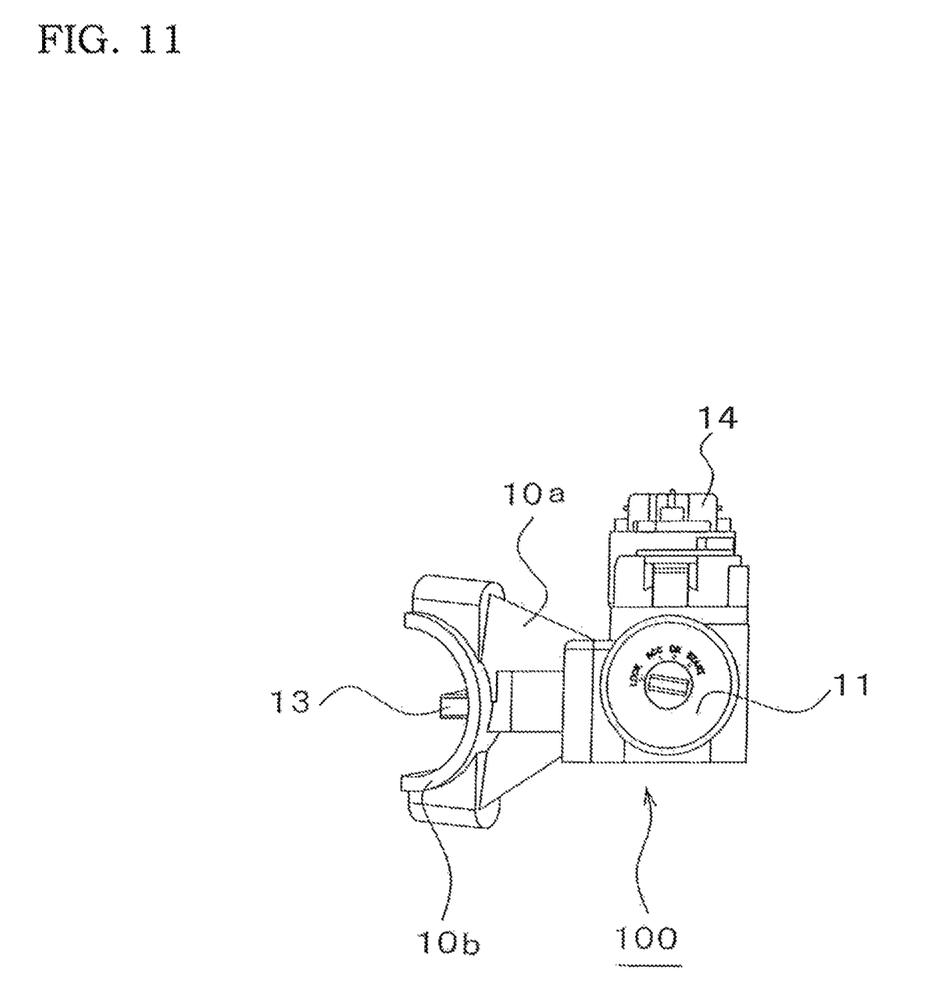
FIG. 11 is a front view of a steering lock device similar to that of FIG. 9, illustrating an embodiment in which an ignition switch is provided to an upper side of a body.

Note that in the steering lock device 100 of the embodiment, the coupling tube part 10a into which the lock bolt 13 is inserted is arranged to one side part of the body 10 and the ignition switch 14 is arranged to the other side part of the body 10. However, an embodiment of the present invention is not limited to this embodiment, a similar effect can be obtained even when an arrangement position of the ignition switch 14 is changed arbitrarily, as long as the driving shaft 34 is placed within the range of the angle θ, illustrated by a dot line in FIG. 9, to an axis 48 (see FIG. 9) orthogonal to the forward-backward direction of the lock bolt 13. Thus, for example, as illustrated in FIG. 10 and FIG. 11, the ignition switch 14 may be arranged to the body side part, the angle of which is changed by 90° to the protruding direction (forward-backward movement direction of lock bolt 13) of the coupling tube part 10a.

The present invention can be applied as a steering lock device for a vehicle, including an ignition switch.

What is claimed is:

1. A steering lock device comprising:
a hollow body;
a key cylinder which is provided to a front side in the hollow body and becomes rotatable when a key is inserted;

a lock bolt configured to correspond to rotation of the key cylinder and to lock or unlock rotation of a steering shaft;
an ignition switch including a rotary switch configured to correspond to the rotation of the key cylinder and to perform switch operation; and
a camshaft having a second cam to rotate integrally with the key cylinder and move the lock bolt forward and backward,
wherein the lock bolt is provided inside a coupling tube part protruded from a rear side of the hollow body in such a manner that the lock bolt can move forward and backward in a direction orthogonal to a rotation axis of the key cylinder,
wherein the ignition switch includes a first switch and a second switch and is arranged to a side part of the hollow body in a direction different from the forward movement direction of the lock bolt, and
the first switch is configured to include a main switch including the rotary switch, and the second switch is configured as a key detection switch including a push switch which is pushed by a driving shaft movably provided to the rotating operation shaft of the rotary switch and performs switch operation,
the steering lock device further comprising:
a gear mechanism configured to convert rotation driving force of the key cylinder from a direction of the rotation axis of the key cylinder to the orthogonal direction and to transfer to a rotor of the rotary switch; and
a first cam, configured to move the driving shaft by backward movement of the key cylinder due to insertion of the key.

2. The steering lock device according to claim 1, wherein the ignition switch is arranged to a side part of the hollow body in an opposite direction, across the rotation axis of the key cylinder, of the coupling tube part providing the lock bolt inside.

3. The steering lock device according to claim 1, wherein the gear mechanism includes a first bevel gear provided to the camshaft coupled to the key cylinder and a second bevel gear which is coupled to the first bevel gear and rotates around a second rotary shaft in an orthogonal direction to a first rotary shaft of the first bevel gear, the second bevel gear being coupled to the rotor of the rotary switch, and
the first cam is provided to the camshaft, configured to push the driving shaft.

4. The steering lock device according to claim 1, wherein a first bevel gear is arranged coaxially with the camshaft.

5. The steering lock device according to claim 1, wherein the lock bolt can be locked to/unlocked from the steering shaft and the second cam, and configured to make the lock bolt operate according to the rotation of the key cylinder, wherein the second cam and the first cam are provided to the camshaft coupled to the key cylinder.

6. The steering lock device according to claim 1, wherein the first cam includes a tilting part configured to move the driving shaft by movement in an axial direction of the camshaft and a circular apex configured to hold the driving shaft at a moved position during a rotation of the camshaft.

* * * * *